United States Patent [19]

Myllymaki

[11] 4,289,191

[45] Sep. 15, 1981

[54] INJECTION MOLDING THERMOPLASTIC PATTERNS HAVING CERAMIC CORES

[75] Inventor: Richard A. Myllymaki, Quaker Hill, Conn.

[73] Assignee: United Technologies Corporation, Hartford, Conn.

[21] Appl. No.: 136,599

[22] Filed: Apr. 2, 1980

[51] Int. Cl.³ .......................... B22C 7/02; B22C 7/06
[52] U.S. Cl. ........................................ 164/45; 164/34; 164/230; 425/573; 264/275
[58] Field of Search ...................... 164/45, 34, 35, 25, 164/26, 137, 340, 60, 366, 367, 397, 133, 135, 113, 119, 120, 228, 230; 249/61, 62, 107, 110; 264/278, 279, 275, 162; 425/572, 573, 568, 120

[56] References Cited

U.S. PATENT DOCUMENTS

| | | | |
|---|---|---|---|
| 1,516,667 | 11/1924 | Bungay | 249/107 |
| 2,279,380 | 4/1942 | Reid | 249/107 |
| 2,431,349 | 11/1947 | Stacy | 249/107 |
| 2,624,071 | 1/1953 | Strahm et al. | 425/568 X |
| 3,074,112 | 1/1963 | Bobrow | 264/275 X |
| 3,659,645 | 5/1972 | Rose | 164/366 X |
| 3,945,535 | 3/1976 | Leiste et al. | 425/568 X |
| 3,981,344 | 9/1976 | Hayes et al. | 164/26 |
| 4,062,396 | 12/1977 | Day | 164/15 |
| 4,199,315 | 4/1980 | Gallizia et al. | 249/107 X |
| 4,210,616 | 7/1980 | Eckhardt et al. | 425/573 X |

OTHER PUBLICATIONS

"Injection Molding—Theory and Practice", by I. I. Rubin, Wiley-Interscience, New York, 1972, pp. 124–126.

Primary Examiner—Robert D. Baldwin
Assistant Examiner—K. Y. Lin
Attorney, Agent, or Firm—C. G. Nessler

[57] ABSTRACT

Disclosed is a method and apparatus for fabricating thermoplastic patterns for investment casting. The patterns define hollow objects and have contained within a very precisely located ceramic core. Thermoplastic is injected into the pattern die on either side of the core, thereby avoiding distortion, movement or breakage of the core. Multiple sprues are used; the sprues are individually fed from a nozzle having a single central bore. The configuration of the nozzle tip and the cavity from which the sprues emanate is such that a gate or bridge is not formed at the entrance to the die assembly. Accordingly, removal of the pattern from the die may be effected by pulling the part coaxially with the sprues, thereby avoiding the necessity of splitting the die where the sprues are located.

9 Claims, 4 Drawing Figures

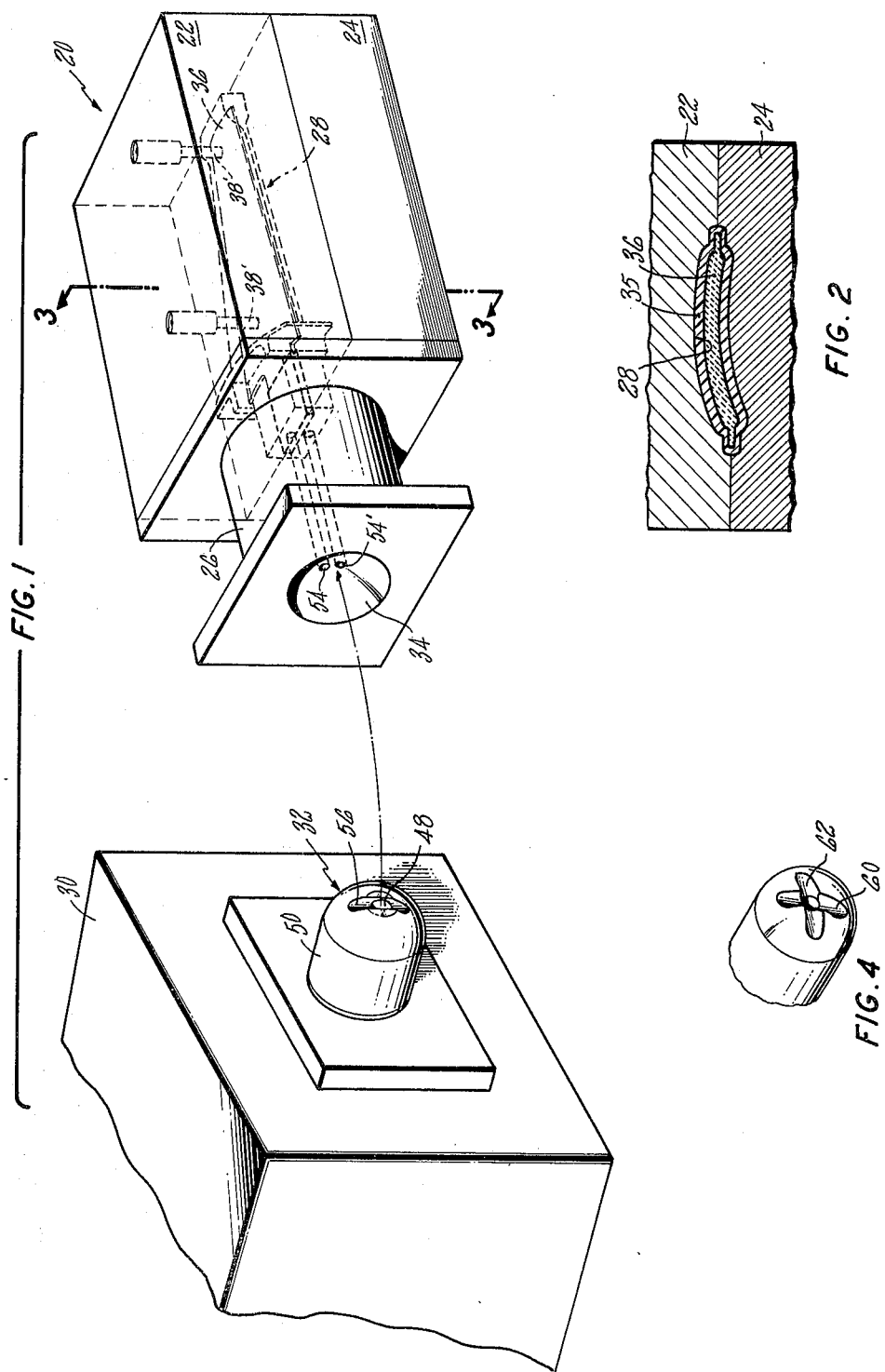

INJECTION MOLDING THERMOPLASTIC PATTERNS HAVING CERAMIC CORES

DESCRIPTION

1. Background Art

1. The present invention relates to the field of injection molding, more particularly the formation of thermoplastic patterns for investment molds for hollow gas turbine blades and vanes.

2. The "lost wax" process is said to date back to antiquity. Essentially, the process involves fabricating an expendable model of the object sought to be cast from metal. This pattern, made from material such as wax which is typically meltable or dissolvable, is surrounded with ceramic mold material (the "investment") which has the property of being able to retain its shape. After the ceramic material is formed, the wax pattern is melted out, thereby leaving within the ceramic material a cavity having the contour of the part sought. Of course, proper compensation is made for solidification shrinkage of the pattern material and molten metal.

The fidelity of a casting, as compared to a drawing, is dependent in part on the accuracy with which both the pattern and the mold are made. A further complication arises when the part sought is to be hollow; in such instances a core, usually of a ceramic material, is placed in the center of the wax pattern. As extensions of the core are left with little or no wax surrounding them, the core will be captured within the mold upon the melting of the pattern. The wall thickness of the hollow article will thus be controlled by the precision to which the core is located within the wax pattern.

Patterns are made from various low melting point polymers, and thermoplastics such as hard filled waxes are preferred. Patterns may be formed by a variety of methods, but most preferred is injection molding of the molten wax into a precision metal die. The die typically opens along various parting lines to facilitate removal of the solidified pattern, and insertion of the core for the next pattern. In the case of gas turbine blades, these metal dies are quite expensive, owing to the unusual and precise contours of such parts. Likewise, the ceramic cores have similar complexity, precision requirements and high cost.

The problem of core location, particularly in the fabrication of turbine blades from bonded blade halves, has been addressed heretofore. See for example U.S. Pat. to Kelso et al Nos. 4,078,598 and Herold 4,068.702, both assigned to the present assignee herein, wherein various types of locators are used, in combination with other mechanical restraints. Further improvements in the location of cores and in the design of dies have been made and they are described in the copending application of Obrochta and Disa, Ser. No. 136,600, "Cambered Core Positioning for Injection Molding", filed on even date hereof. The invention herein will be found to be especially useful in combination with the invention of the copending application.

Injection molding of polymers is a well developed art. However, it is fair to say that there are few hollow parts injection molded to the high precision and demanding quality required in the fabrication of gas turbine airfoils. For example, the wall thickness (i.e., pattern thickness) of a gas turbine airfoil may vary between 1.3 and 0.5 mm (0.050 and 0.020 inches), and be held to tolerance greater than ±0.012 mm (±0.005 inches). In itself this may not seem like a demanding requirement, but the contoured ceramic core which has its own inherent deviations and these accumulate with those of the injection molding process. Further since the core is brittle and often fragile it cannot accept high clamping forces or distortion and some movement must be allowed in the die. Thus the problem of accurate pattern formation is a significant one, as those familiar with the specialty recognize.

It is necessary that the injection molding be accomplished rapidly so that hot material may fill all the smaller cavities. This necessitates high pressures. But when pressure is increased, differential pressures on the core can cause it to shift out of position and thereby produce an imprecise part, or even break the core. Temperature may be increased to increase fluidity, but then problems arise with shrinkage and the like and thus temperature must be limited. The die which forms the pattern is of necessity made in multiple pieces which all must be adapted to separate and then come together in immovable and precise fashion while withstanding the internal pressures of the thermoplastic molding process. It is therefore desirable that the number of elements in the die be limited. Further, provision must be made for holding the core both prior to closing of the die and during the injection molding process; but this provision should not interfere with the formation of an accurate pattern.

It will be seen that the invention relates to gating and feeding of the molten polymer to the die. Gating is the means by which molten material is distributed to different parts of a die cavity. Typically material is introduced to the die assembly at a single point and thereafter distributed by means of channels. See for instance U.S. Pat. to Reid Nos. 2,279,380 and Bungay 1,516,667. Typically, single parts are fed by single gates or sprues, but of course with larger parts more complex gate systems have been used. Inasmuch as gas turbine blades are considered to be relatively small within the field of injection molding, it has been the practice to use a single gate heretofore.

Despite the efforts and technology of the past, there is found to be variation in wall thickness of patterns beyond that which is optimally desired. Further knit lines and the like where polymer flows within the die produce unevenness in the surface of the pattern and resultant part further influencing the tolerance achieved. Accordingly, there is need for still improved methods of forming precision thermoplastic patterns containing ceramic cores.

DISCLOSURE OF THE INVENTION

An object of the invention is to provide means for improving the quality of a thin walled wax pattern while at the same time avoiding dislocation or breakage of a relatively fragile ceramic core in the die. A further object is to improve injection molding apparatus and die construction when multiple sprues are used.

According to the invention a method and apparatus are provided wherein thermoplastic polymer, such as wax, is injected on either side of the core. Preferably, in the case of a thin walled gas turbine blade, this is done by means of sprues running parallel to the longitudinal axis of the part. In the best embodiment of the invention, the sprues are fed from a single socket on the exterior of the die, while wax is fed from a simple nozzle having a single discharge port. The nozzle has a relief channel in the tip so that when the nozzle and socket are mated a cavity is created wherein wax will flow from the nozzle bore to the individual sprue ports. But in the practice of the invention there will be no solid gate formed between the sprues at the socket, as would be expected. Therefore removal of the pattern and attached sprues from the die is easily effected by longitudinal movement of the pattern away from the socket at the die surface. This avoids the necessity of splitting the body which contains the sprues and simplifies die construction. In another embodiment of the invention the flow to different portions of the die may be controlled by variation of the diameter or configuration of the sprues.

The invention is a simple yet effective means for improving the manufacture of wax patterns. Knit and flow lines are eliminated and surface finish and pattern detail are improved. Core shifting and cracking resulting from unbalanced pressures during injection molding are minimized. Of course, improvements in patterns produce more accurate parts and reduce cost throughout the entire process of manufacturing castings.

BRIEF DESCRIPTION OF DRAWINGS

FIG. 1 is a perspective view of the apparatus for injection molding patterns in a metal die.

FIG. 2 is a cross section through the airfoil section of the die cavity of FIG. 1 showing the ceramic core and thin walled pattern.

FIG. 4 is an alternate embodiment of the nozzle shown in FIG. 1.

BEST MODE FOR CARRYING OUT THE INVENTION

Figure 3:
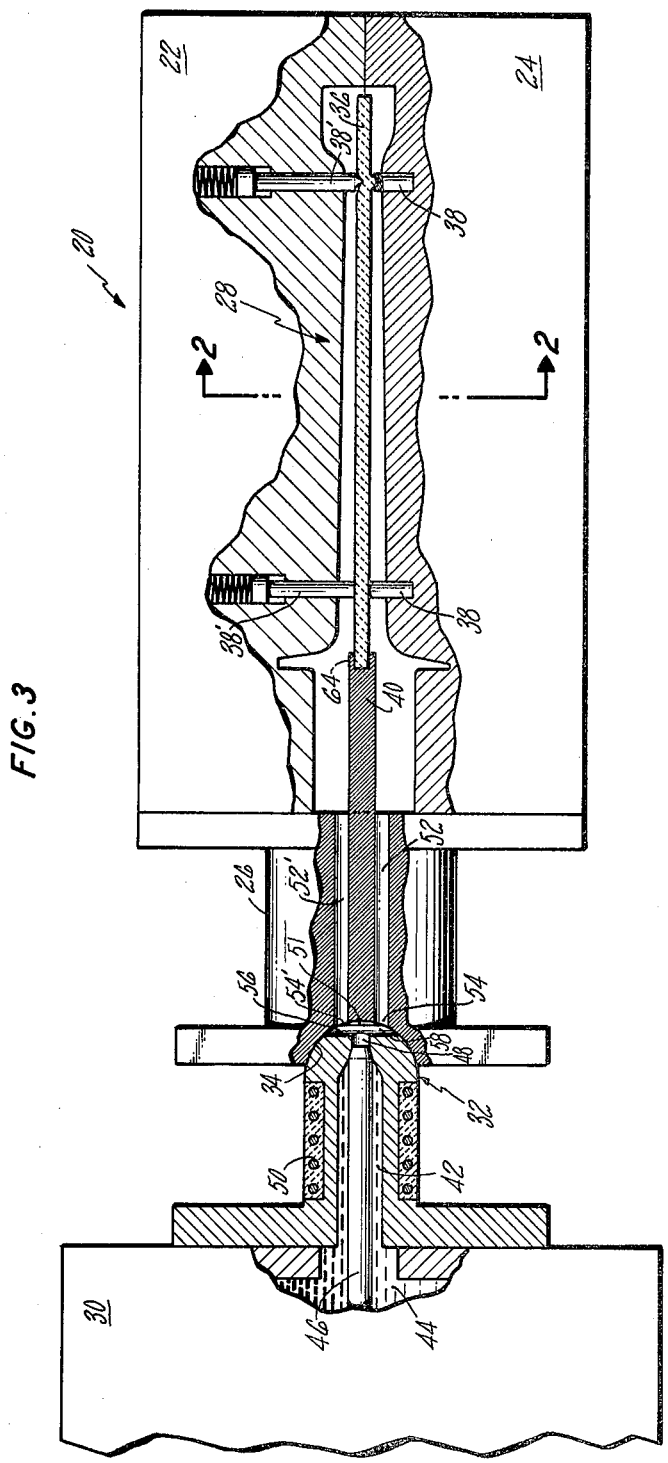
FIG. 3, is a longitudinal cross section of the appartus in FIG. 1, with the separate components in mated position.

The invention is usable in injection molding of patterns with cores for making various hollow articles, particularly those which have very thin walls. The invention will be found particularly useful as part of a new approach to the production of turbine blades. This new approach is comprised of first casting a hollow article separable into opposing halves, and then separating and rejoining them to form the finished article. Thus, greater complexity in the internal configuration may be provided by the core, easy inspection of the internal cavity is accomplished. Cores of greater cross section and rigidity (often called strongbacks) are usable. Other patents relate to the process and will aid in understanding the use of the present invention.

An investment casting mold and process relating to the foregoing approach is disclosed in U.S. Pat. No. 3,981,344 to Hayes et al. A particularly convenient way of making a unitary pattern assembly from which a mold can be accurately made is disclosed in U.S. Pat. No. 4,062,396 to Day. The disclosures of both patents are hereby incorporated by reference.

A variety of means can be employed to injection mold wax patterns. In the present invention a machine of commercial manufacture is used. The machine has a heated reservoir of molten wax which is supplied under pressure to a nozzle. The pattern shape is defined by a multi-part metal die insertable into the machine. A ceramic core is placed in the die which is then closed, and engaged with the nozzle. The machine applies pressure to the die to hold it in the closed position while wax is injected through the nozzle into the die under controlled temperature, pressure and flow. Usually liquid wax pressure is maintained at the die entry port until the pattern is judged to have solidified, to provide additional wax as the pattern solidifies and shrinks.

FIG. 1 shows portions of the foregoing system and the invention. The multi-part die 20 is shown in relatively simple form, comprised of three primary elements. A first part 22 and a second part 24 mate to form the cavity 28 which will define the outer dimensions of the pattern for the desired gas turbine blade. A third part, the sprue body 26, transfers wax from a receiving point to the other two parts of the die when all are fixedly clamped together during wax injection. The elements are moved apart when access to the cavity 28 is desired; this is accomplished automatically by means of hydraulic cylinders, slides, guides and the like which are not shown. Molten wax is stored in a reservoir 30 and issues from a nozzle 32 connected to the reservoir. The nozzle is adapted to mate with a socket 34 on the surface of the sprue body 26 of the die.

FIG. 2 is a cross section through the airfoil section of the blade pattern cavity 28 which is shown, in this view only, filled with a wax 35 which surrounds a ceramic strongback core 36 which runs along the length of the blade, and which ultimately permits the hollow casting to be split into two pieces. The wax pattern in the cross section shown typically may vary in thickness from 0.5 to 1.3 mm. The typical pattern shown will be 24 cm long by 6 cm wide, of which the actual blade portion is about 14 cm of the length. The overall volume of the pattern is about 180 cubic centerimeters. Thus is will be appreciated that there is a considerable volume of material which must be injected and much of it must be passed through a relatively narrow space between the core and die wall.

FIG. 3 is a longitudinal cross section through the apparatus shown in FIG. 1, but with the nozzle 32 shown mated to the sprue body 26. The core 36 can be seen within the die as it is held by means of multiple locating pins 38 and 38'. The function and disposition of these pins is described in more detail in the copending application of Obrochta and Disa, mentioned in the Background section. The pins serve to locate the core in three planes. However, inasmuch as the core is a brittle ceramic material and has small variations, provision must be made within the die to accommodate these aspects without breaking the part. As shown the pins 38' are spring loaded. In other instances all the pins may be immovable, but will be spaced apart to accept a core with the maximum dimensional deviation; this will result in certain number of the cores being loose and therefore more susceptible to shifting. But in either instance it has been found that (a) the core will be susceptible to some movement due to the introduction of wax into the pattern; (b) the blade wall space between the core and the metal die cavity, being relatively small in cross section is difficult to fill, impedes through-flow, and is found to have knit lines and (c) the core is too often deflected or even broken during injection at various points, especially between the locating pins. The core 36 is also loosely supported by the chill bar 40 which is discussed in more detail below.

The nozzle 32 has a central bore 42 which is in communication with the molten wax 44 contained in the reservoir 30. A retractable plunger 46 controls the flow of wax from the nozzle exit port 48; the plunger is controlled by a hydraulic cylinder or the like, not shown. The nozzle is also fitted with a heating element 50 to maintain the nozzle above the melting point of the wax contained therein. The nozzle end has a semi-spherical shape, as does the socket 34 in the sprue body 26. The tip of the nozzle is typically slightly relieved or cut back as shown by space 51 (of the order of 0.01 mm) to avoid bottoming at the nozzle tip instead of around the peripheries of the nozzle and socket, as this has been found to be desirable past practice to assuredly obtain a seal. Thus, when the two parts are forced tightly together by operation of the injection molding machine a metal-to-metal seal is formed which prevents the escape of wax, even in the event of slight axial misalignment. Communicating with the socket 34 are two straight sprues 52 and 52' having a circular cross section. The sprues, which are about 8 mm diameter, have a slightly expanding diameter (about 60 seconds of included angle along the axis) in the direction toward the pattern. These meet the socket at two ports 54 and 54' and discharge into the pattern at the root of the blade. It will be seen that the sprues are nominally parallel (± a few degrees) to the longitudinal axis of the blade and that one sprue is located on either side of the longitudinal projection of the mean contour or datum of the core. It will be further observed that the chill bar is located between the points at which the sprues discharge into the pattern cavity. The manner in which the nozzle bore opening 48 communicates with the sprue ports 54 and 54' is notable. A channel 56 (see FIG. 1 as well) has been placed in the face of the nozzle so that it intersects the nozzle bore port 48. This channel, being a substantial recess or relief in the nozzle thus forms with the socket a cavity 58 through which wax may flow from the nozzle into each of the sprues. The channel is perpendicular to the long axis of a 17 mm spherical radius nozzle and is semi-circular in cross section with a radius of about 4.4 mm. It has a depth (~2.2 mm) and length (25 cm) of the minimum necessary to connect the two ports, which are about 9 mm apart, so that the channel, which is of course decreasing in effective width as it moves radially is sufficiently wide at a port to fully deliver wax thereto. The requisite features of the channel are further described below.

The operation of the aforementioned apparatus and further features will now be described. The sprue body 26 is placed in contact with the second part 24 of the die. The core 36 is inserted in the die. Location of the core is accomplished by the pins; but holding before closing is aided, when die configuration and disposition in space necessitates, by the end 64 of the chill bar 40. Next the first part 22 of the die is mated to the other parts, thereby locating the core in the pattern cavity through action of the pins. The die is preferably at a temperature of around 27° C. The die assembly 20 is next placed tightly in contact with the nozzle. Wax, such as KC 401 mineral base pattern wax (Kindt Collins, Inc., Cleveland, Ohio), with a melting point of about 73° C. is supplied at between 77° and 93° C., preferably 82° C., and a pressure between 100 and 1500 kPa, preferably about 1300 kPa (190 psig), to the nozzle; the plunger 46 is retracted to allow the wax to flow into the cavity 58, through the ports 54, 54', to the sprues 52, 52' and into the pattern cavity 28. The plunger is left open until sufficient time has elapsed, typically of the order of 120 seconds until the wax has solidified. The optional chill bar 40 both reduces the volume of the wax in the root portion and speeds its solidification by conduction of heat into the sprue body and thence to the surrounding environment. Of course the wax in the sprues also freezes. But owing to the temperature of the nozzle the wax in the cavity 58 formed between the nozzle and socket is not believed to fully freeze, although it is presumed a solid skin forms where the wax in the cavity touches the cold socket surface. Thereafter the plunger 46 is moved to close the nozzle bore and the nozzle is separated from the sprue body. After this separation, most likely attributed to capillary action, it will be found that the semi-molten wax in the cavity 58 will be retained in the relief channel 56 of the nozzle. Consequently there will be no solidifcation material connecting the two sprue ports 54, 54'. Next the sprue body 26 is separated from the still-joined other die parts 22 and 24. Since the sprues are slightly tapered and parallel with the chill bar and the axis of the part, and since some shrinkage has taken place, and since there is no connecting material in the socket, the sprue bars will remain connected to the rest of the pattern and therefore will be withdrawn from the sprues. It will be seen that since a gate or residue connecting the sprues at the ports, has been avoided, there is no need of having to part the sprue body. Thereafter the other two elements of the die, parts 22 and 24, can be separated and pattern removal will be effected manually, with or without the aid of ejector pins which are well known in the art.

It has been experimentally found that injection of the wax in the dual-spruce manner just described will greatly reduce the occurrence of core breaking and at the same time will result in the complete filling of the pattern, even in the thin walled portions, without the presence of knit lines which will occur through the use of a single sprue channel. Where the opposing side of the core have unequivalent volumes, or where it otherwise appears advantageous, the flow to either side of the core may be controlled by differentially sizing the sprue diameters, or providing different diameter orifices at the ports 54 and 54'. The configuration of a hollow turbine airfoil makes it particularly necessary to inject from entries at either the root or the tip ends to obtain pattern filling with minimum hydrostatic force on the core. In parts of different or more complex configuration, such as those having more than one core, more than two sprues may be appropriate, in accord with the principles described herein. For thermoplastics having more capacity for elongation, the sprues may not need by fully straight or parallel with the axis of the part, but only need be such that to enable withdrawal.

The inventive combination of nozzle and socket may be also used with sprue bodies and dies in which the sprues are not withdrawn along their longitudinal axis but are removed by parting of the sprue body. The sprue body optionally may be an integral part of one or both of the other portions of the die, or conversely, there may be more than three elements to the die assembly. In such instances, the invention will be effective in allowing the introduction of polymer through separate gates, but at the same time allowing the gates and objects connected thereto to be separated after solidification without the necessity of breaking a connection in the gating. This will speed and simplify production.

An advantage of my invention is that the nozzle is relatively simple and has only a single bore, yet multiple sprues may be fed therefrom. Of course if there are more than two sprues the configuration of the relief 56 in the tip will most likely be altered. FIG. 4, for example, shows two channels 60 and 62 at right angles, making the nozzle suitable for feeding four sprues. I have not tried many configurations of nozzle reliefs beyond that shown in the preferred embodiment. But since I have observed that molten wax from the cavity is retained in the relief, it is probable that the relief must be of a preferred configuration insofar as capillary attraction is concerned. I have observed that an entirely flat relief, such as the truncation of the nozzle by flattening the tip (a substantial extension of the slight tip relief which creates the space 51), is not effective: a bridge between the sprue ports 54, 54' will be formed. Thus I have deduced the principle that the surface area of the relief in the nozzle must be greater than the mating surface area of the portion in the socket which with the relief creates the cavity 58. Also it logically follows that the ratio of nozzle surface area to socket surface area (i.e., the surface areas of the portions thereof which defined the cavity) should be maximized to enhance the effect. Consequently I believe that a channel or other depression is necessary in the tip, as opposed to the simple truncation of the tip which violates my foregoing criterion.

In addition to channels, another embodiment which will meet my criterion is one in which the exit port 48 of the nozzle is expanded conically outward to a diameter sufficient to circumscribe the ports. However, such a configuration is not the best for two ports, since by comparison the channel will provide less exposure of the socket surface, and a better ratio of nozzle exposed surface area of socket exposed area. To further aid the operation of my invention, the socket should be kept in a highly polished condition and periodically sprayed with a die lubricant, such as a silicone oil.

The invention may also be used in a nozzle-die connection wherein there is no socket if other alignment and sealing means are provided. For example, the die may simply have a flat surface portion containing two ports and the nozzle may have a flat tip which butts against the flat surface. The nozzle would have a channel recess in its flat tip to practice the invention. Sealing would be provided by a standard face seal, such as an o-ring, and alignment would be independently achieved. The invention also may on occasion be useful for discharge to single die entry ports, such as in instances where the alignment cannot be achieved and a flashing must be avoided at the die entry port.

The use of my invention much reduces core breakage and mislocation, and produces more uniform and knit-line free patterns. This is attributable to the more even distribution of wax provided by the sprues which discharge wax on either side of the core line. Further, die construction is simplified since it is not necessary to have a sprue body which opens to allow removal of the sprue material, nor to have an operator manually remove a residual gate or bridge between the sprues. Thus, the invention facilitates the mass production of patterns, consistent with the objectives of other inventions in patents related hereto and the entire process of making castings, especially of directionally solidified materials.

As mentioned, my invention will be found applicable to the production of other hollow precision parts, and I believe even to parts which are not hollow or separated by cores and the like. Further it will be equally useful for the injection of other materials than wax, including but not limited to thermoplastics, other polymers, and even metals.

Although this invention has been shown and described with respect to a preferred embodiment thereof, it should be understood by those skilled in the art that various changes and omissions in the form and detail thereof may be made therein without departing from the spirit and scope of the invention.

I claim:
1. In the process of fabrication of a ceramic investment casting mold containing a thin and brittle ceramic core, wherein a thermoplastic polymer is injection molded into a die to form an expendable pattern in a die cavity, wherein a portion of the mold defines a shape of the airfoil of a gas turbine, the improvement which comprises simultaneously injecting the polymer on either side of the core from an end of the die through at least two sprues with balanced flow that minimizes hydrostatic force on the core.

2. The process of claim 1 which further comprises feeding the two sprues from a single socket on the exterior of the die and supplying polymer to the socket by means of a disengageable nozzle having a single opening.

3. The process claim 2 wherein two sprues are used, which further comprises placing a metal bar in the die cavity between the points at which the sprues enter, to partially support the core and to speed the cooling of a portion of the pattern.

4. In injection molding using a nozzle with a single port and a die with multiple ports, the method of preventing solid material from forming between the die ports which comprises providing a higher surface area in a portion of the nozzle than in a portion of the die with which the nozzle mates, said die and nozzle portions being those which cooperatively define a liquid cavity connecting the multiple ports.

5. In apparatus for injection molding the combination comprising a single port nozzle having a surface relief channel intersecting the port and a multiple ports die, the nozzle and die defining a liquid carrying cavity when mated, the portion of the nozzle which defines the cavity having a higher surface area than the portion of the die which defines the cavity.

6. Apparatus for injection molding, within a cavity in a multi-part die, a thermoplastic polymer pattern having therewithin a precisely located thin ceramic core, for defining the shape of a thin walled article such as a hollow turbine blade, comprising:
   a source of molten polymer;
   a nozzle having a central bore running to a port at its tip and a surface relief portion intersecting the port, the nozzle connected to the source to provide polymer at the tip;
   a socket in the die surface, the socket having at least two ports therein, the socket adapted to receive the nozzle and form a liquid tight seal therewith, the surface relief portion of the nozzle forming, when mated with the socket, a cavity connecting the central port of the nozzle with the die ports; and
   means for conveying polymer separately from each socket port to the pattern cavity in the die.

7. The apparatus of claim 6 wherein the means for conveying polymer from the ports to the pattern cavity comprise sprues entering the pattern cavity at the end of the blade on opposite sides of the longitudinal extension of the mean contour of the core.

8. The apparatus of claim 7 wherein the sprues are parallel within a sprue body, to permit withdrawal of solidified polymer therein by movement of the attached pattern toward the pattern cavity, to permit the use of a one-piece sprue body.

9. The apparatus of claims 6 or 7 further comprising means for balancing the flow through the conveying means to control the rate at which polymer is introduced into the separate points in the pattern cavity and produce a more uniform part.

* * * * *